(12) United States Patent
Schoenhaber et al.

(10) Patent No.: US 12,247,505 B2
(45) Date of Patent: Mar. 11, 2025

(54) EXHAUST GAS PURIFICATION SYSTEM FOR PURIFYING EXHAUST GASES OF INTERNAL COMBUSTION ENGINES

(71) Applicant: UMICORE AG & CO. KG, Hanau-Wolfgang (DE)

(72) Inventors: Jan Schoenhaber, Darmstadt (DE); Joerg-Michael Richter, Frankfurt (DE); Carolin Braun, Langen (DE); Tim Palm, Ronneburg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 18/580,496

(22) PCT Filed: Jul. 11, 2022

(86) PCT No.: PCT/EP2022/069288
§ 371 (c)(1),
(2) Date: Jan. 18, 2024

(87) PCT Pub. No.: WO2023/001617
PCT Pub. Date: Jan. 26, 2023

(65) Prior Publication Data
US 2024/0318587 A1    Sep. 26, 2024

(30) Foreign Application Priority Data
Jul. 21, 2021    (DE) .......................... 102021118801.6

(51) Int. Cl.
*F01N 3/00* (2006.01)
*B01J 23/10* (2006.01)
(Continued)

(52) U.S. Cl.
CPC .......... *F01N 13/0093* (2014.06); *B01J 23/10* (2013.01); *F01N 3/035* (2013.01); *F01N 3/0842* (2013.01);
(Continued)

(58) Field of Classification Search
CPC .... F01N 13/0093; F01N 3/035; F01N 3/0842; F01N 3/101; F01N 2370/00; F01N 2510/06; B01J 23/10
See application file for complete search history.

(56) References Cited

U.S. PATENT DOCUMENTS 5,120,695 A    6/1992  Blumrich et al.
6,468,941 B1  10/2002  Bortun et al.
(Continued)

FOREIGN PATENT DOCUMENTS

DE         10023439 A1    11/2001
DE    102010046762 A1     3/2011
(Continued)

OTHER PUBLICATIONS

International Search Report dated Oct. 31, 2022 for International Patent Application No. PCT/EP2022/069288 (4 pages in German; 3 pages English translation).
(Continued)

*Primary Examiner* — Matthew T Largi
(74) *Attorney, Agent, or Firm* — Smith, Gambrell & Russell, LLP (57) ABSTRACT

The present invention is directed to the purification of exhaust gases of an internal combustion engine operated predominantly with a stoichiometric fuel mixture. The exhaust system has in particular 4 purification functions in a particular order. A three-way catalyst (TWC1) near the engine is followed by a gasoline particle filter (GPF) and another three-way catalyst (TWC2) downstream thereof.
(Continued)

The system additionally has a nitrogen oxide storage function.

8 Claims, 3 Drawing Sheets

(51) Int. Cl.
*F01N 3/035* (2006.01)
*F01N 3/08* (2006.01)
*F01N 3/10* (2006.01)
*F01N 13/00* (2010.01)

(52) U.S. Cl.
CPC .......... *F01N 3/101* (2013.01); *F01N 2370/00* (2013.01); *F01N 2510/06* (2013.01)

(56) References Cited

U.S. PATENT DOCUMENTS

| | | |
|---|---|---|
| 6,585,944 B1 | 7/2003 | Nunan et al. |
| 6,729,129 B2 | 5/2004 | Yamamoto et al. |
| 6,938,411 B2 | 9/2005 | Hoffmann et al. |
| 7,984,609 B2 | 7/2011 | Döring et al. |
| 8,066,963 B2 | 11/2011 | Klingmann et al. |
| 8,158,551 B2 | 4/2012 | Verdier et al. |
| 8,277,880 B2 | 10/2012 | Sato et al. |
| 8,341,947 B2 | 1/2013 | Hepburn et al. |
| 8,398,943 B2 | 3/2013 | Döring et al. |
| 8,464,522 B2 * | 6/2013 | Fujiwara ............... F02D 41/029 60/285 |
| 8,617,497 B2 | 12/2013 | Adelmann et al. |
| 8,663,588 B2 | 3/2014 | Lindner et al. |
| 8,776,500 B2 | 7/2014 | Gonze et al. |
| 9,517,462 B2 | 12/2016 | Roesch et al. |
| 9,957,911 B2 | 5/2018 | Sczomak et al. |
| 10,066,576 B2 | 9/2018 | Gwidt et al. |
| 10,072,549 B2 | 9/2018 | Inaguma et al. |
| 10,279,313 B2 | 5/2019 | Gabrielsson |
| 10,323,593 B2 | 6/2019 | Ball et al. |
| 10,413,886 B2 | 9/2019 | Despres et al. |
| 10,914,217 B2 | 2/2021 | Joo et al. |
| 11,073,057 B2 | 7/2021 | Joo et al. |
| 11,179,676 B2 | 11/2021 | Schoenhaber et al. |
| 11,185,820 B2 | 11/2021 | Schoenhaber et al. |
| 11,220,942 B2 | 1/2022 | Hupfeld et al. |
| 11,291,952 B2 | 4/2022 | Schoenhaber et al. |
| 11,305,269 B2 | 4/2022 | Deibel et al. |
| 2001/0006934 A1 | 7/2001 | Kachi et al. |
| 2004/0101453 A1 * | 5/2004 | Fujiwara ............... F01N 3/0814 422/177 |
| 2005/0282698 A1 | 12/2005 | Southward et al. |
| 2006/0010857 A1 | 1/2006 | Hu et al. |
| 2009/0193796 A1 | 8/2009 | Wei et al. |
| 2010/0107606 A1 | 5/2010 | Naryanaswamy et al. |
| 2011/0072784 A1 | 3/2011 | Hepburn et al. |
| 2011/0073088 A1 | 3/2011 | Hubbard et al. |
| 2011/0120089 A1 * | 5/2011 | Koch ................... F01N 3/035 60/297 |
| 2011/0202253 A1 | 8/2011 | Perry et al. |
| 2011/0271664 A1 | 11/2011 | Boorse et al. |
| 2015/0107228 A1 * | 4/2015 | Klingmann .......... B01D 53/945 60/297 |
| 2015/0132188 A1 | 5/2015 | Howard |
| 2015/0266002 A1 | 9/2015 | Biberger et al. |
| 2016/0051931 A1 | 2/2016 | Ito et al. |
| 2016/0228852 A1 * | 8/2016 | Biberger ............. B01J 37/0244 |
| 2016/0245207 A1 * | 8/2016 | Ball .................... F01N 3/101 |
| 2017/0014766 A1 * | 1/2017 | Schoenhaber ........ F01N 3/0814 |
| 2017/0274321 A1 * | 9/2017 | Zheng ................. B01J 37/0244 |
| 2018/0038252 A1 * | 2/2018 | Yang ................... B01D 53/9422 |
| 2018/0080357 A1 * | 3/2018 | Jung ...................... F01N 3/035 |
| 2018/0230882 A1 | 8/2018 | Ghoniem et al. |
| 2018/0318763 A1 | 11/2018 | Biberger et al. |
| 2018/0347425 A1 * | 12/2018 | Otsuka ............... B01D 46/2482 |
| 2019/0120109 A1 | 4/2019 | Clark et al. |
| 2019/0351393 A1 | 11/2019 | Nunan et al. |
| 2019/0351397 A1 | 11/2019 | Nunan et al. |
| 2019/0351398 A1 | 11/2019 | Nunan et al. |
| 2019/0353067 A1 | 11/2019 | Moser et al. |
| 2020/0157995 A1 | 5/2020 | Paukner et al. |
| 2020/0378286 A1 | 12/2020 | Hengst et al. |
| 2021/0162382 A1 | 6/2021 | Hengst et al. |
| 2021/0236976 A1 | 8/2021 | Foerster et al. |
| 2022/0168721 A1 | 6/2022 | Schoenhaber et al. |
| 2022/0176355 A1 | 6/2022 | Kucerova et al. |
| 2022/0176364 A1 | 6/2022 | Schoenhaber et al. |
| 2024/0318588 A1 | 9/2024 | Schoenhaber et al. |

FOREIGN PATENT DOCUMENTS

| | | |
|---|---|---|
| DE | 102013211387 A1 | 12/2013 |
| DE | 102017102393 A1 | 8/2017 |
| DE | 102016112657 A1 | 1/2018 |
| DE | 102018108346 A1 | 10/2019 |
| DE | 102019204744 A1 | 8/2020 |
| DE | 102019219115 A1 | 6/2021 |
| EP | 0 324 082 A1 | 7/1989 |
| EP | 0 885 650 A2 | 12/1998 |
| EP | 1 046 423 A2 | 10/2000 |
| EP | 1 541 220 A1 | 6/2005 |
| EP | 1 657 410 A2 | 5/2006 |
| EP | 1 726 359 A1 | 11/2006 |
| EP | 1 876 331 A2 | 1/2008 |
| EP | 1 882 832 A2 | 1/2008 |
| EP | 1 892 395 A1 | 2/2008 |
| EP | 1 921 044 A2 | 5/2008 |
| EP | 2 007 682 A1 | 12/2008 |
| EP | 2 042 226 A2 | 4/2009 |
| EP | 1 974 809 B1 | 9/2010 |
| EP | 1 900 416 B1 | 4/2011 |
| EP | 3 045 226 A1 | 7/2016 |
| EP | 3 247 493 A1 | 11/2017 |
| EP | 3 298 252 A1 | 3/2018 |
| EP | 3 536 919 A1 | 9/2019 |
| EP | 3 595 796 A1 | 1/2020 |
| EP | 3 484 602 B1 | 2/2020 |
| EP | 3 639 908 A1 | 4/2020 |
| EP | 3 639 919 A1 | 4/2020 |
| EP | 3 695 902 A1 | 8/2020 |
| EP | 3 642 460 B1 | 2/2021 |
| WO | 95/35152 A1 | 12/1995 |
| WO | 2004/076829 A1 | 9/2004 |
| WO | 2008/000449 A2 | 1/2008 |
| WO | 2008/106518 A2 | 9/2008 |
| WO | 2008/106519 A1 | 9/2008 |
| WO | 2009/012348 A1 | 1/2009 |
| WO | 2011/110919 A1 | 9/2011 |
| WO | 2011/131324 A1 | 10/2011 |
| WO | 2012/135871 A1 | 10/2012 |
| WO | 2012/175409 A1 | 12/2012 |
| WO | 2015/121910 A1 | 8/2015 |
| WO | 2016/057285 A1 | 4/2016 |
| WO | 2017/082563 A1 | 5/2017 |
| WO | 2017/153239 A1 | 9/2017 |
| WO | 2018/069199 A1 | 4/2018 |
| WO | 2019/121375 A1 | 6/2019 |
| WO | 2019/121994 A1 | 6/2019 |
| WO | 2019/121995 A1 | 6/2019 |
| WO | 2019/134958 A1 | 7/2019 |
| WO | 2020/058265 A1 | 3/2020 |
| WO | 2020/069548 A1 | 4/2020 |
| WO | 2020/200394 A1 | 10/2020 |
| WO | 2020/200397 A1 | 10/2020 |
| WO | 2020/200398 A1 | 10/2020 |
| WO | B18 2023/001863 A1 | 1/2023 |
| WO | B19 2023/001865 A1 | 1/2023 |

OTHER PUBLICATIONS

Written Opinion of the International Searching Authority dated Oct. 31, 2022 for International Patent Application No. PCT/EP2022/069288 (7 pages in German).

(56) References Cited

OTHER PUBLICATIONS

DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
U.S. Appl. No. 18/580,561, filed Jan. 18, 2024, Schoenhaber et al.
U.S. Appl. No. 18/580,581, filed Jan. 18, 2024, Schoenhaber et al.
Meier, W.M. Zeolites and zeolite-like materials. Pure and Applied Chemistry. 1986. vol. 58, No. 10, pp. 1323-1328.
Lupescu. Jason, et al. A New Catalyzed HC Trap Technology that Enhances the Conversion of Gasoline Fuel Cold-Start Emissions. SAE Int. J. Fuels Lubr 2018. vol. 11(4), pp. 411-425.
Non Final Office Action mailed Jul. 18, 2024 in U.S. Appl. No. 18/580,561 (11 pages).
Translation of the Written Opinion of the International Searching Authority mailed Oct. 31, 2022 for International Patent Application No. PCT/EP2022/069288 (6 pages).
International Preliminary Report on Patentability mailed Jan. 18, 2024 for International Patent Application No. PCT/EP2022/069288 (8 pages in German; 7 pages English translation).
Non Final Office Action mailed Aug. 26, 2024 in U.S. Appl. No. 18/580,581 (14 pages).

* cited by examiner

EXHAUST GAS PURIFICATION SYSTEM FOR PURIFYING EXHAUST GASES OF INTERNAL COMBUSTION ENGINES

The present invention is directed to the purification of exhaust gases of an internal combustion engine operated predominantly with a stoichiometric fuel mixture. The exhaust system has in particular 4 purification functions in a particular order. A three-way catalyst (TWC1) near the engine is followed by a gasoline particle filter (GPF) and another TWC2 downstream thereof. The system additionally has a nitrogen oxide storage function.

Exhaust gases from internal combustion engines operated with predominantly (>50% of the operating time) stoichiometric air/fuel mixture, i.e., Otto engines powered by gasoline or natural gas, are purified in conventional methods using three-way catalysts (TWC). Such catalysts are capable of simultaneously converting the three main gaseous pollutants of the engine, namely hydrocarbons, carbon monoxide and nitrogen oxides, into harmless components. "Stoichiometric" means that on average exactly as much air is available for combustion of the fuel present in the cylinder as is required for complete combustion. The combustion air ratio $\lambda$ ($\lambda$/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If $\lambda<1$ (e.g., 0.9), this means "air deficiency" and one speaks of a rich exhaust gas mixture; $\lambda>1$ (e.g., 1.1) means "excess air" and the exhaust gas mixture is referred to as lean. The statement $\lambda=1.1$ means that 10% more air is present than would be required for the stoichiometric reaction.

The catalytically active materials used in the three-way catalysts are usually platinum group metals, in particular platinum, palladium and rhodium, which are present, for example, on γ-aluminum oxide as a support material. In addition, three-way catalysts contain oxygen storage materials, e.g., cerium/zirconium mixed oxides. In the latter case, cerium oxide, a rare earth metal oxide, constitutes the component that is fundamental to the oxygen storage. Along with zirconium oxide and cerium oxide, these materials may contain additional components, such as further rare earth metal oxides or alkaline earth metal oxides. Oxygen storage materials are activated by applying catalytically-active materials, such as platinum group metals, and therefore also serve as support material for the platinum group metals.

Such catalytically active materials together with ingredients are applied to, for example, flow-through substrates by a coating process. After drying and calcining the substrates, they can be installed in the exhaust system. Flow-through substrates are made of ceramic materials, such as silicon carbide, aluminum titanate, and cordierite, and have been proven to be useful for a long time. They are composed of a large number of parallel channels formed by porous walls. The channels are open at both ends of the flow-through substrate. The exhaust gas thus flows from the inlet region to the outlet region and in the process contacts the catalytically active material applied to the walls.

In addition to the gaseous pollutants, the exhaust gas of such internal combustion engines also contains very fine particles (PM) which result from the incomplete combustion of the fuel and substantially consist of soot. In contrast to the particle emission of diesel engines, the particles in the exhaust gas of stoichiometrically operated combustion engines, such as gasoline engines, are very small and have an average particle size of less than 1 µm. Typical particle sizes range from 10 to 200 nm. Furthermore, the quantity of particles emitted is very low and ranges from 2 to 4 mg/km.

In the field of purifying exhaust gas from lean-burn engines, i.e., in particular diesel engines, particle filters made of ceramic materials, such as silicon carbide, aluminum titanate and cordierite, have long proven themselves. These wall-flow filters are made up of a large number of parallel channels formed by porous walls. The channels are alternately closed at one of the two ends of the filter so that channels A, which are open at the first side of the filter and closed at the second side of the filter, and channels B, which are closed at the first side of the filter and open at the second side of the filter, are formed. For example, exhaust gas flowing into channels A can only leave the filter via channels B and must flow through the porous walls between channels A and B for this purpose. When the exhaust gas passes through the wall, the particles are retained and the exhaust gas is cleaned. Such aggregates are referred to as wall-flow filters.

The particles retained in this manner must subsequently be burnt off or oxidized in order to prevent a clogging of the filter or an unacceptable increase in the back pressure of the exhaust system. For this purpose, for example, the wall-flow filter can be provided with catalytically active coatings that reduce the ignition temperature of soot. Applying such coatings to the porous walls between the channels (so-called on-wall coating) or introducing them into the porous walls (so-called in-wall coating) is already known. EP1657410A2 also already describes a combination of both coating types; that is, part of the catalytically active material is present in the porous walls and another part is present on the porous walls.

The concept of removing particles from exhaust gas by means of wall-flow filters has already been applied to the purification of exhaust gas from internal combustion engines operated with a stoichiometric air/fuel mixture; see, for example, EP2042226A2 (gasoline particle filter; GPF). According to its teaching, a wall-flow filter comprises two layers arranged one above the other, wherein one can be arranged in the porous wall and the other can be arranged on the porous wall.

Since the Euro 6c stage took effect in September 2017, European emissions legislation has required exhaust gas measurements to be carried out under real driving conditions on the road (Real Driving Emissions; RDE). Depending upon driving conditions, this can mean that the catalyst will have to meet much higher demands-particularly with respect to the dynamic conversion of carbon monoxide and nitrogen oxides. In the currently valid exhaust emission standards, pollutants such as HC, CO, NOx and particles must also comply with the limits of the Euro 6d standard under RDE conditions for all new vehicles. In addition, a certain $CO_2$ fleet limit should not be exceeded. Especially also with regard to secondary emissions such as $N_2O$ and $NH_3$, future exhaust emission standards in Europe and the world will certainly place even more demanding requirements on internal combustion engines and their exhaust gas processing.

It can be assumed that simple catalysts and/or filters are no longer sufficient for such standards. Therefore, more complex exhaust systems will also have to be introduced in the field of predominantly stoichiometrically operated internal combustion engines. By way of example, reference is made to EP3639919A1, in which an exhaust gas system consisting of a first TWC followed by a GPF and another TWC downstream of the GPF was proposed. By means of these systems, it must then be ensured that sufficient catalytic activity and filtration efficiency are combined with the lowest possible exhaust gas back pressure. In particular, the exhaust gas back pressure of a corresponding system leads to an increased consumption of fuel, which has a negative effect on the $CO_2$ performance.

There is therefore still a need for exhaust gas purification systems for internal combustion engines operated predominantly with stoichiometric fuel mixtures, which are capable of eliminating all required harmful components of the exhaust gas of these engines in the highest possible manner and in this process require the lowest possible additional fuel consumption.

These and further objects arising from the prior art for the person skilled in the art are solved by an exhaust system according to the present invention. The stated objects are extremely surprisingly and advantageously achieved as a result of the specification of an exhaust gas purification system for purifying exhaust gases of a predominantly stoichiometrically operated internal combustion engine, comprising a TWC1, which is near the engine and is on a flow-through substrate, a GPF, which is attached downstream of the TWC1 and is in the form of a wall-flow filter, and an additional TWC2, which is downstream of the GPF and is on a flow-through substrate, the system additionally comprising materials for temporarily storing nitrogen oxides in a separate coating, said additional material being selected from the group consisting of $K_2O$, $Na_2O$, CaO, BaO, MgO, SrO, $CeO_2$, $ZrO_2$, cerium mixed oxides, zeolites, or mixtures thereof, and said material being present in the coating at more than 50 wt. %.

The establishment of a separate nitrogen oxide storage function in the system presented above provides an optimal combination of four functional exhaust gas purification components which allows future exhaust gas limits to be met and which also opens up the possibility of realizing a high level of total noble metal reduction in the system. As a result of the additional nitrogen oxide storage function, nitrogen oxides can be temporarily stored when conversion of the nitrogen oxides by means of the three-way catalysts cannot be ensured at the operating point in question, for example when the operating temperature is too low or there is too little reductant. These temporarily stored nitrogen oxides can then be released and converted during suitable operating states, i.e. when a sufficient temperature and sufficient reductant are ensured. In particular, cold start emissions of NOx can thereby be effectively decreased.

The nitrogen oxide storage capability of the materials used can be determined according to the procedure mentioned in the experimental section. The nitrogen oxide storage capability or capacity discussed in the context of this invention is specified as the quotient of the stored mass of nitrogen oxide per liter of installed substrate volume.

Materials for temporarily storing nitrogen oxides are those which are capable of temporarily storing at least 25 mg NOx per L of substrate volume, preferably 50 mg NOx per L of substrate volume, and most preferably 75 mg NOx per L of substrate volume. These are added to the system in a separate coating. Materials which are already used in the existing catalysts in the system and which are also capable of temporarily storing nitrogen oxides should not be taken into account in this regard. They are excluded from the definition according to the claims (materials which temporarily store nitrogen oxides). For example, the TWCs also contain cerium or cerium-zirconium mixed oxides, which are likewise able to temporarily store nitrogen oxides. However, these substances are only subordinately able to do this, for example due to the structure or the more specific composition. Less than the amounts of nitrogen oxides indicated above can regularly be stored by these substances. By means of the limit defined above, a delimitation with respect to a conventional system having TWC1-GPF-TWC2 is sufficiently ensured, so that the claim according to the invention relates exclusively to a corresponding system having TWC1-GPF-TWC2 to which, in addition to the materials already present in the catalysts of the system, material which temporarily stores nitrogen oxides has been added in a separate coating.

According to the invention, the term "temporary" is understood to mean that the storage-capable material can, in certain operating states of the exhaust gas system, store nitrogen oxides and, in other operating states, releases them again or no longer takes them up. This is the case in conventional nitrogen oxide storage catalysts (nitrogen storage catalyst; NSC), which, in a certain temperature range, are able to store nitrogen oxides and which then, by brief regeneration with a reducing environment, desorb the nitrogen oxides and reduce them to nitrogen. With regard to the mode of action and the materials to be preferably used, reference is made to the relevant literature (WO2020058265A1; EP3695902A1; WO2018069199A1).

However, the materials which temporarily store nitrogen oxides can also preferably be those materials which, at a certain temperature, store the nitrogen oxides and which, at elevated temperatures, release them again without reduction, e.g. as $NO_2$. These are referred to as passive nitrogen oxide absorbers (passive NOx absorber; PNA). The former preferably takes place in a temperature range of 25-150° C., more preferably 25-175° C., and most preferably 25-200° C. The release of the nitrogen oxides (in net terms, more is released than stored) preferably takes place above a temperature of 300° C., more preferably 350° C., and most preferably 400° C. Such materials are well known to a person skilled in the art (US2019120109AA; US2018318763AA; US2015266002AA; WO2019134958A1; US2021162382AA).

For both the NSCs and the PNAs, it is preferred that the storage materials come into contact with $NO_2$. This can be stored more easily, for example in the form of nitrates, than NO, for example. It is therefore advantageous if the materials for temporarily storing nitrogen oxides also have catalysts for the oxidation of NO to $NO_2$. Here, different embodiments are considered by a person skilled in the art. In general, the storage materials are accompanied by noble metals which catalyze the oxidation of NO to $NO_2$. These are in particular the noble metals Pt and/or Pd, which are present in the nitrogen oxide storage materials individually or together at a specific weight ratio of 1:10-10:1, more preferably 1:8-8:1, and most preferably 1:6-6:1.

The actual materials which temporarily store the nitrogen oxides are well known to a person skilled in the art. In the present case, such materials which are selected from the group consisting of $K_2O$, $Na_2O$, CaO, BaO, MgO, SrO, $CeO_2$, $ZrO_2$, cerium mixed oxides (in particular with $Al_2O_3$ or zirconium oxide), zeolites, or mixtures thereof are used. Alkaline-earth metal oxides, such as BaO, CaO, SrO, and/or cerium oxide and/or cerium mixed oxides, in particular cerium-zirconium mixed oxides, should preferably be mentioned in this context. $CeO_2$ and/or BaO is very particularly preferred. Many of these materials have appropriately good binding for nitrate ($NO_3^-$). They are able to accomplish the aforementioned minimum value for nitrogen oxide storage with a loading which is not excessive. Preferably employed as materials which temporarily store nitrogen oxides are those which are able to store more than 0.05, more preferably more than 0.1, and most preferably more than 0.15 mg of nitrogen oxides, calculated as $NO_2$, per g of material (for determination, see below). These materials which temporarily store nitrogen oxides are present in a sufficient quantity in the exhaust system. A preferred quantity for the coating containing the storing materials has been found to be 100-500 g/L, preferably 125-450 g/L, and most preferably 150-400 g/L of substrate volume.

The material which temporarily stores the nitrogen oxides can be distributed in the exhaust gas purification system to one or the units already present. The corresponding material can be present on one or more substrates such that the material is separated, in relation to the catalytically active materials which may already be present, in zones or layers. As such, it is appropriate to locate the material which temporarily stores the nitrogen oxides predominantly on the first TWC1. Any nitrogen oxides released from the TWC1 can support the soot burn-off in the downstream GPF (so-called CRT® reaction). Likewise, when conventional nitrogen oxide storage catalyst materials are used, the nitrogen oxide store can be easily regenerated by means of enrichment of the exhaust gas by the engine. As a result, the TWC1 can possibly be regenerated together with the functionality of an NSC and the downstream GPF by raising the exhaust gas temperature; e.g., the NSC can be desulfurized and the GPF can be freed of the soot (see DE10023439A1).

Figure 1:
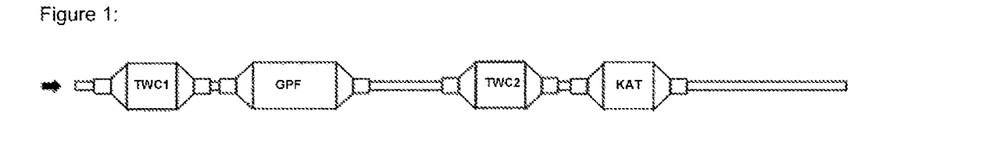
FIG. 1: Shows an according to the invention with KAT in the final position.
Figure 2:
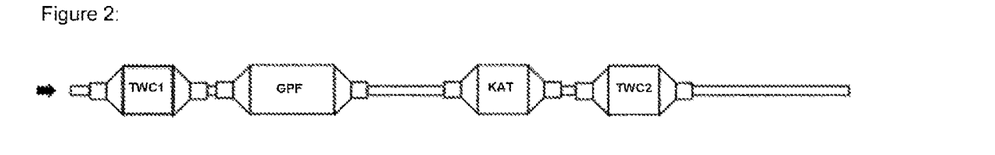
FIG. 2: Shows an according to the invention with KAT in the position upstream of the TWC2.
Figure 3:
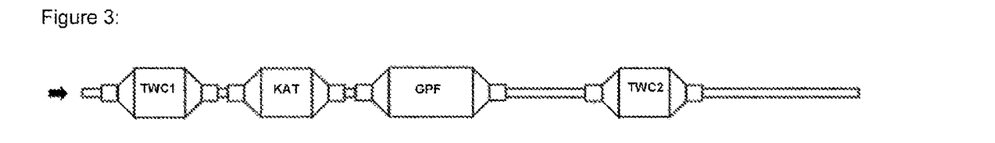
FIG. 3: Shows an according to the invention with KAT in the position near the engine.

However, alternatively but preferably, the material which temporarily stores the nitrogen oxides can be arranged on a separate flow-through substrate. In this case, this flow-through substrate (KAT) can be arranged in the exhaust gas purification system according to aspects known to a person skilled in the art (see FIG. 1-3). An arrangement in which KAT is arranged downstream of the TWC1 and preferably upstream of the GPF is preferred. The advantages are the same as those mentioned above for locating the corresponding material on the TWC1. In particular, it appears to be advantageous if the KAT is arranged at a distance of 30-150 cm, preferably 30-100 cm, and most preferably 30-50 cm downstream of the outlet of the TWC1.

The KAT has a relatively high washcoat loading in g/L, which ranges from 100-500 g/L, preferably 125-450 g/l, and most preferably 150-400 g/l. In general, it has proven to be advantageous if the individual substrates of the exhaust gas purification system according to the invention (TWC1, GPF, TWC2, KAT) are in a certain ratio to one another with regard to the size of the volume that they occupy. Thus, it is advantageous if the TWC1 occupies a fraction of the volume of the total system which is between 20 and 50% by volume, preferably 30-40% by volume. The GPF should have a volume fraction of 20-60% by volume, preferably 25-55% by volume, based on the total system. Likewise, the fraction of TWC2 in the total system should be 10-40% by volume, preferably 15-35% by volume. The KAT comprising the material for temporarily storing nitrogen oxides has a fraction of preferably 5-30% by volume, more preferably 10-30% by volume, of the total volume of the substrates in the exhaust gas purification system. Total system here is understood to mean the sum of the volumes calculated from the external dimensions of the substrates of TWC1, GPF, TWC2 and KAT.

It may also be advantageous if the materials which temporarily store nitrogen oxides are also supplemented with materials capable of storing oxygen. The latter are the oxygen storage materials which are usually used in the TWCs. These have the effect of providing a more oxygen-rich environment, which is beneficial for the oxidation of NO to $NO_2$. Corresponding materials are described, inter alia, in EP2007682A1, EP1921044A2 U.S. Pat. No. 6,468,941B1, U.S. Pat. No. 6,585,944B1 and US20050282698A1. Preferably, cerium oxides, cerium-zirconium mixed oxides or cerium or cerium-zirconium mixed oxides doped with La, Y, Pr, Nd are considered in this respect. The amount of oxygen-storing material used can be set by a person skilled in the art, but should not be below 0.2 g/g, preferably 0.3 g/g, in relation to the total weight of the materials which temporarily store nitrogen oxides.

TWC1 and TWC2 are modern three-way catalysts. A person skilled in the art knows which one would be used for the present purpose (see, for example, WO2019121994A1, WO2019121995A1, WO9535152A1, WO2008000449A2, EP0885650A2, EP1046423A2, EP1726359A1, EP1541220A1, EP1900416B1, EP3045226A1, WO2009012348A1, and EP1974809B1). Three-way catalysts consist essentially of the components: precious metal, high-surface-area carrier oxide, and oxygen-storing material. The oxygen storage materials are in particular those in which cerium/zirconium/rare earth metal mixed oxides occur. Lanthanum oxide, yttrium oxide, praseodymium oxide, neodymium oxide, samarium oxide, and mixtures of one or more of these metal oxides may, for example, be considered the rare-earth metal oxide. Lanthanum oxide, yttrium oxide, neodymium oxide, and mixtures of one or more of these metal oxides are preferred. Particularly preferred are lanthanum oxide and yttrium oxide, and a mixture of lanthanum oxide and yttrium oxide is quite particularly preferred in this context. High-surface-area, temperature-stable oxides are considered as a carrier oxide by a person skilled in the art. As a rule, these are aluminum oxides, silicon oxides, zirconium oxides, or titanium oxides, or mixtures thereof. Active aluminum oxide in particular is known to a person skilled in the art in this context. It particularly describes γ-aluminum oxide with a surface of 100 to 200 $m^2/g$. Active aluminum oxide is frequently described in the literature and is commercially available. It generally contains silicon oxide or lanthanum oxide as a stabilizer in an amount of up to 10 wt % relative to the aluminum oxide. Three-way catalysts for the most part contain platinum group metals such as Pt, Pd, and Rh as catalytically active components, with Pd and Rh being particularly preferred. The catalytically active metals are often deposited in a highly disperse manner on the high-surface-area oxides and/or the oxygen storage materials. It is particularly preferred for the precious metals to be pre-fixed on the oxygen storage material before it is mixed with the other components into the coating mixture. Zoned or layered embodiments are now the norm for TWCs. In a preferred embodiment, at least the TWC1 has a two-layer structure, preferably as described in EP3247493A1.

The three-way catalysts are preferably applied to a flow-through substrate by a coating step familiar to the person skilled in the art. Flow-through substrates are catalyst carrier commonly used in the prior art, which can consist of metal (corrugated carrier, for example WO17153239A1, WO16057285A1, WO15121910A1 and literature cited therein) or ceramic materials. Refractory ceramics, such as cordierite, silicon carbide or aluminum titanate, etc., are preferably used. The number of channels per area is characterized by the cell density, which typically ranges between 300 and 900 cells per square inch (cpsi). The wall thickness of the channel walls in ceramics is between 0.5-0.05 mm.

According to the invention, the TWC1 is preferably installed near the engine. This means that there is only a distance of 1-40 cm between the turbocharger and the inlet-side face of the TWC1. Preferable, the catalyst TWC1 is installed 2-30 cm and most preferably 3-20 cm from the turbocharger. The GPF can be installed at a distance from the TWC1, for example in the underbody of the vehicle. However, the embodiment in which the GPF is installed rather close to the outlet-side end of the TWC1 is preferred. Preferably, the distance between the outlet-side face of the TWC1 and GPF is 1-60 cm, more preferably 2-50 cm, and most preferably 3-40 cm. The TWC2 either is installed directly downstream of the filter in a position near the engine or is used in the underbody of the vehicle in the exhaust system. As a result, the temperature load of this TWC is a different than that of TWC1. For this reason, the two TWCs can differ from one another in some characteristics. Preferably, the TWC2 has a lower washcoat loading than the TWC1. Preferably, the TWC1 consists of at least 2-4 different three-way catalyst layers or zones, while the TWC2 preferably consists of at least 1-2 three-way catalyst layers or zones. The TWCs have a common washcoat loading. The washcoat loading is preferably 100-400 g/L, more preferably 125-375 g/L, and most preferably 150-325 g/L. In a further embodiment, it has proven to be advantageous if the washcoat loading in g/L of TWC1 is greater than that of TWC2, in particular by a factor of between 1.25-4, more preferably 1.5-3. In addition, the noble metal concentration in g/L on TWC1 is preferably greater than on TWC2, in particular by a factor of 1.25-20, more preferably 1.5-10.

The GPF has the form of a wall-flow filter. All ceramic materials customary in the prior art can be used as wall-flow filters. Porous wall-flow filter substrates made of cordierite, silicon carbide, or aluminum titanate are preferably used. These wall-flow filter substrates have inflow and outflow channels, wherein the respective downstream ends of the inflow channels and the upstream ends of the outflow channels are alternately closed off with gas-tight "plugs." In this case, the exhaust gas that is to be purified and that flows through the filter substrate is forced to pass through the porous wall between the inflow channel and outflow channel, which delivers an excellent particulate filtering effect. The filtration property for particulates can be designed by means of the porosity, pore/radii distribution, and thickness of the wall. The catalyst material can be applied to the porous walls of the inlet and outlet channels in the form of the coating suspension according to the invention. The porosity of the wall-flow filters is typically more than 40%, generally from 40% to 75%, particularly from 45% to 70% [as measured according to DIN 66133-latest version on the date of application]. The average pore size (diameter) is at least 3 µm—for example, from 3 µm to 34 µm, preferably more than 5 µm, and in particular from 5 µm to 28 µm, or from 7 µm to 22 µm [measured according to DIN 66134, latest version on the date of application].

The GPF can be used uncoated, with a dry powder coating or provided with an additional, possibly wet-manufactured coating in the system according to the invention (EP3595796A1, WO2020200394A1, WO2020200397A1). Corresponding wet-manufactured filters with improved filtering effect are presented in WO2019121375A1 or WO2020200398A1. Alternatively or cumulatively, coating with a dry powder can also be considered (see, for example, DE102018108346A1, U.S. Pat. No. 8,277,880B2). First and foremost, the filtration efficiency of the filter is likewise improved thereby, without the exhaust gas back pressure of the filter being unduly worsened. However, the GPF can also accommodate a catalytic coating. In the present case, this is usually a coating with a three-way catalyst. The composition corresponds to the statements made above. Thus, all units in the exhaust gas purification system according to the invention can have catalytically active noble metals of the provenance specified above. In an advantageous embodiment, the GPF has a higher noble metal concentration in g/L of substrate volume than the TWC2. If present, the KAT also has a higher noble metal concentration in g/L of substrate volume than the TWC2. However, depending on the application, both embodiments mentioned can also occur reciprocally. In a particular case, the TWC2 may be designed such that it only has rhodium as a noble metal.

If the GPF is provided with a coating, the washcoat loading is 10-200 g/L, preferably 20-175 g/L, and most preferably 25-150 g/L. The washcoat loading g/L of the KAT thus preferably exceeds that of the GPF. It is advantageous here if the function for temporarily storing nitrogen oxides, accommodated on a separate flow-through substrate (KAT), has a greater washcoat loading in g/L than the GPF.

"Electrically heated catalyst" (EHC) are special catalyst bodies which can be heated by applying a power source. The advantage of such systems is that operating states of the exhaust gas purification system are avoided in which the catalysts are not or are no longer sufficiently active due to low temperatures. Such operating states substantially exist when the vehicle has been started only recently. By rapid electrical heating of the catalyst substrates, the catalysts located thereon can be brought to conversion temperature and thus the emission of unconverted pollutants can be reduced. In the present case, it is particularly advantageous if at least one of the catalyst substrates (TWC1, GPF, TWC2 or KAT) present in the system is an electrically heatable substrate. It is very preferred if this is the TWC1. Due to its positioning in the system, this is first to reach working temperature. Therefore, the use of electricity is lowest here, which is extremely preferable, especially with regard to hybrid applications, as the battery can be conserved. Corresponding EHC systems in hybrid vehicles are known to a person skilled in the art (U.S. Pat. No. 8,776,500BB).

In order to further reduce the pollutants which are emitted by the vehicle under cold running conditions, a so-called hydrocarbon trap (HCT) can be provided in the exhaust gas purification system according to the invention. The HCT absorbs the emitted hydrocarbons from the exhaust gas at low temperatures of less than 200° C., preferably less than 250° C. (net absorption). The HCT may be associated with an oxidation catalyst. As such, platinum and/or palladium and/or rhodium may be considered. Particularly those from US20190351397AA, US20190351398AA or US20190351393AA come into consideration as embodiments and materials for the HCT. As a storage material, zeolites such as beta which are exchanged with a transition metal such as iron or copper are extremely preferably used.

Also advantageous is a system according to the invention which additionally comprises a catalyst for reducing emissions of $NH_3$ (ammonia slip catalyst; ASC). This catalyst is preferably used in the rear part of the system according to the invention, particularly preferably on the TWC2. This catalyst has the task of decreasing ammonia which is formed when nitrogen oxides are overreduced. Ammonia can be converted via this catalyst into harmless nitrogen by means of oxidizing agents, such as oxygen or further nitrogen oxides. Catalysts of this type are well known to a person skilled in the art (EP3484602B1). The ASC can also be located on the filter (EP3298252A1).

A subject matter of the present invention is also a method for purifying exhaust gases of a predominantly stoichiometrically operated internal combustion engine, in which the exhaust gas is passed through an exhaust gas purification system according to one of the preceding claims. The preferred and alternative embodiments mentioned for the system also apply mutatis mutandis to the method.

With the exhaust system and the proposed method according to the present invention, it is possible to be able to comply with the exhaust gas limits of future, even stricter emission standards. In addition to the standard values such as HC, CO, NOx, and soot, the system according to the invention also allows the reduction of so-called secondary pollutants, e.g. $NH_3$, $N_2O$ and others. Specifically, the arrangement of the TWC1 near the engine enables very high conversion rates for the emission-relevant pollutants CO, HC, and NOx. The additional TWC2 can optionally have a support effect and, especially at operating points with a high load and exhaust gas mass flows, can help to ensure high conversion rates of CO, HC, and NOx. By contrast, the use of the particle filter leads to significant deposition rates of soot, so that the given emission limits can be reliably met. It is well known to the person skilled in the art that classic three-way catalysts cannot completely reduce nitrogen oxides in the corresponding temperature regimes and at the corresponding engine operating points. Finally, the use of materials which temporarily store nitrogen oxide, located for example in a separate catalyst substrate (KAT), ensures that especially nitrogen oxides formed during the cold start can additionally be significantly reduced. Such a system is thus predestined for use in automobiles which will have to comply with future strict exhaust gas limits for an approval.

EXAMPLES

Determination of the Nitrogen Oxide Storage Capability

Figure 4:
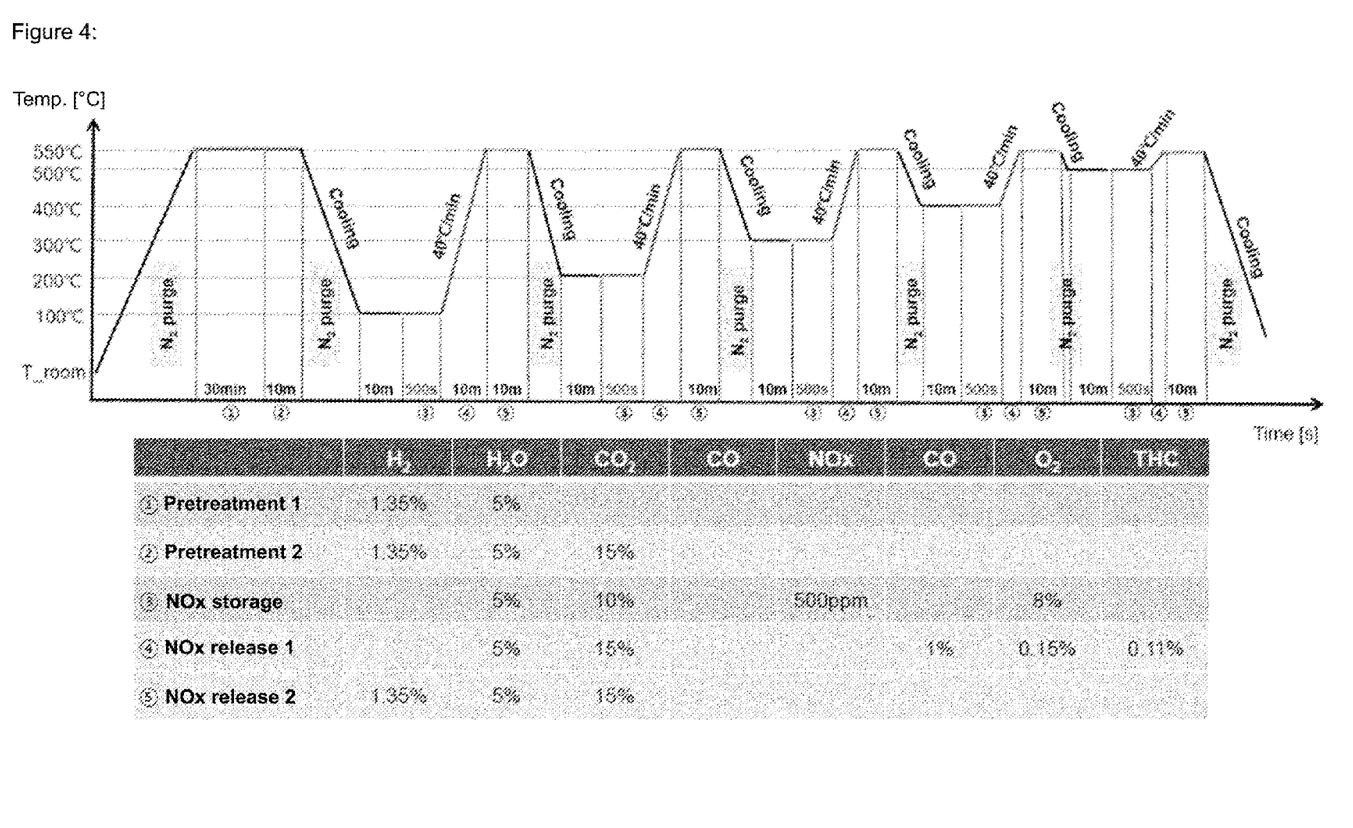
FIG. 4: Determination of the nitrogen oxide storage capability.
Figure 5:
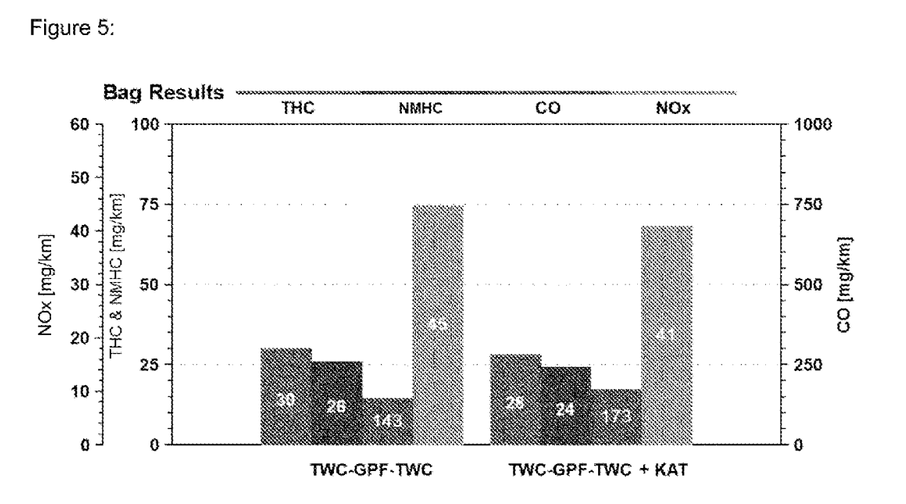
FIG. 5: Averaged bag emissions for THC/NMHC/CO/NOx of the two exhaust gas aftertreatment systems TWC-GPF-TWC and TWC-GPF-TWC+KAT in comparison.

The nitrogen oxide storage capability/capacity is determined experimentally in a flow tube reactor. From the region of the catalyst substrate whose nitrogen oxide storage capacity is to be determined, a drill core is taken as specimen. Preferably, a drill core 1 inch in diameter and 3 inches long is taken as the specimen. The drill core is inserted into the flow tube reactor and conditioned at a temperature of 650° C. rich/lean cycles of 10 seconds each with in a gas atmosphere composed of 500 ppm nitrogen monoxide, 7 vol. % oxygen, 10 vol. % water, 10 vol. % carbon dioxide, 50 ppm hydrocarbons (propane/propene 17/33) and the remainder nitrogen in the lean phases and a gas atmosphere composed of 500 ppm nitrogen monoxide, 55000 ppm carbon monoxide, 1 vol. % oxygen, 10 vol. % water, 10 vol. % carbon dioxide, 50 ppm hydrocarbons (propane/propene 17/33) and the remainder nitrogen in the rich phases with a space velocity of 50000 $h^{-1}$ for 15 minutes. Subsequently, there are 10 rich/lean cycles of 10 seconds each at 650° C. with a space velocity of 30000 $h^{-1}$ and with a gas atmosphere composed of 0 ppm nitrogen monoxide, 1 vol. % oxygen, 0 vol. % water, 0 vol. % carbon dioxide, 0 ppm hydrocarbons and the remainder nitrogen in the lean phases and with a gas atmosphere composed of 0 ppm nitrogen monoxide, 20000 ppm carbon monoxide, 0 vol. % oxygen, 0 vol. % water, 0 vol. % carbon dioxide, 0 ppm hydrocarbons (propane/propene 17/33) and the remainder nitrogen in the rich phases. Subsequently, cooling to a temperature of 350° C. under nitrogen at a space velocity of 50000 $h^{-1}$ is carried out. Subsequently, there is a conditioning of 3 rich/lean cycles of 20 seconds each at 350° C. with a space velocity of 35000 $h^{-1}$ and with a gas atmosphere composed of 0 ppm nitrogen monoxide, 1 vol. % oxygen, 0 vol. % water, 0 vol. % carbon dioxide, 0 ppm hydrocarbons and the remainder nitrogen in the lean phases and with a gas atmosphere composed of 0 ppm nitrogen monoxide, 20000 ppm carbon monoxide, 0 vol. % oxygen, 0 vol. % water, 0 vol. % carbon dioxide, 0 ppm hydrocarbons (propane/propene 17/33) and the remainder nitrogen in the rich phases. Subsequently, cooling to a temperature of 250° C. under nitrogen at a space velocity of 50000 $h^{-1}$ is carried out and, after stabilization of the temperature, the nitrogen oxide storage capability is determined by switching on a gas mixture composed of 500 ppm nitrogen monoxide, 8 vol. % oxygen, 10 vol. % water, and 10 vol. % carbon dioxide at a space velocity of 30000 $h^{-1}$. This gas mixture remains switched on until the NOx conversion via the specimen is less than 10%. This sequence is also shown in FIG. 4. The value thus determined represents the maximum storage quantity of the nitrogen storage catalyst. This maximum storage quantity is set in relation to the total substrate volume in the system which is aimed at.

Experimental Data:

A Euro 6 gasoline vehicle with 1.5 L DI engine was driven with an exhaust system artificially aged to end-of-life and consisting of a first TWC near the engine with 1.26 L catalyst volume (substrate dimensions 118.4 mm×114.3 mm) and a conventional three-way coating with 1.77 g/L noble metal (0/92/8 Pt/Pd/Rh), an uncoated GPF arranged downstream with 1.39 L catalyst volume (substrate dimensions 132.1 mm×101.6 mm), and a second TWC arranged in the underbody with 1.26 L catalyst volume (substrate dimensions 118.4 mm×114.3 mm) and a conventional three-way coating with 0.83 g/L noble metal (0/80/20 Pt/Pd/Rh) and on a chassis dynamometer in an RTS aggressive driving cycle. This system is referred to as a TWC-GPF-TWC reference system and has a total substrate volume of 3.9 L. The emissions THC, NNHC, CO, NOx, $NH_3$ and $N_2O$ were measured, the measuring technique to be used for this purpose is known to a person skilled in the art. The mean value from a plurality of measurements is shown in each case.

This was compared to a system according to the claims mentioned herein. For this purpose, the same Euro 6 gasoline vehicle with 1.5 L DI engine was driven with an exhaust system artificially aged to end-of-life and consisting of a first TWC near the engine with 1.26 L catalyst volume (substrate dimensions 118.4 mm×114.3 mm) and a conventional three-way coating with 1.77 g/L noble metal (0/92/8 Pt/Pd/Rh), an uncoated GPF arranged downstream with 1.39 L catalyst volume (substrate dimensions 132.1 mm×101.6 mm), a second TWC arranged in the underbody with 0.63 L catalyst volume (substrate dimensions 118.4 mm×57.2 mm) and a conventional three-way coating with 0.83 g/L noble metal (0/80/20 Pt/Pd/Rh), and a KAT arranged downstream thereof with 0.50 L catalyst volume (substrate dimensions 105.7 mm×57.2 mm) and a coating which can additionally temporarily store nitrogen oxides, with 1.34 g/L noble metal (79/8/13 Pt/Pd/Rh), and on a chassis dynamometer in an RTS aggressive driving cycle. TWC-GPF-TWC+KAT system compared to that of the TWC-GPF-TWC reference system. With the same volume of the TWC2 or TWC2/KAT in both systems, there is an advantage for the system according to the invention with regard to the nitrogen oxide conversion and surprisingly also the hydrocarbon emissions.

The invention claimed is:

1. An exhaust gas purification system for purifying exhaust gases of a predominantly stoichiometrically operated internal combustion engine, comprising a TWC1, which is near the engine and is on a flow-through substrate, a gasoline particulate filter GPF, which is attached downstream of the TWC1, and an additional TWC2, which is downstream of the GPF and is on a flow-through substrate, characterized in that the system additionally comprises materials for temporarily storing nitrogen oxides in a separate coating, said additional material being selected from the group consisting of $K_2O$, $Na_2O$, CaO, BaO, MgO, SrO, $CeO_2$, $ZrO_2$, cerium mixed oxides, zeolites, or mixtures thereof, and said additional material being present in the coating at more than 50 wt. % and the materials for temporarily storing nitrogen oxides being arranged on a separate flow-through substrate, wherein the coating which contains the materials for temporarily storing nitrogen oxides is present in a quantity of 100-500 g/L of substrate volume, and wherein the separate flow-through substrate with the materials for temporarily storing nitrogen oxides accounts for a fraction of 5-30% by volume of the total volume of the substrates in the exhaust gas purification system.

2. The system according to claim 1, characterized in that
the materials for temporarily storing nitrogen oxides also have catalysts for the oxidation of NO to $NO_2$.

3. The system according to claim 1, characterized in that
the separate flow-through substrate with the materials for temporarily storing nitrogen oxides has a greater washcoat loading in g/L than the GPF.

4. The system according to claim 1, characterized in that
a washcoat loading in g/L of the TWC1 is greater than that of the TWC2.

5. The system according to claim 1, characterized in that
a noble metal concentration in g/L of the TWC1 is greater than that of the TWC2.

6. The system according to claim 1, characterized in that
at least one substrate can be electrically heated.

7. The system according to claim 1, characterized in that
the GPF has a filtration-increasing coating.

8. A method for purifying exhaust gases of a predominantly stoichiometrically operated internal combustion engine, in which exhaust gas is passed through the exhaust gas purification system according to claim 1.

* * * * *